US012709997B2

(12) United States Patent
Sargsyan et al.

(10) Patent No.: US 12,709,997 B2
(45) Date of Patent: Aug. 18, 2026

(54) MODULAR EXHAUST DEVICE

(71) Applicant: Solar Turbines Incorporated, San Diego, CA (US)

(72) Inventors: Rubine Sargsyan, San Diego, CA (US); Roshan Jameer S.H., Bengaluru (IN); Jennifer Schumacher, San Diego, CA (US); Jennifer Lynn Jaramillo, San Diego, CA (US); Sindhu Penna, Bangalore (IN)

(73) Assignee: Solar Turbines Incorporated., San Diego, CA (US)

( * ) Notice: Subject to any disclaimer, the term of this patent is extended or adjusted under 35 U.S.C. 154(b) by 0 days.

(21) Appl. No.: 18/432,250

(22) Filed: Feb. 5, 2024

(65) Prior Publication Data

US 2025/0250915 A1 Aug. 7, 2025

(51) Int. Cl.
*F01D 25/30* (2006.01)

(52) U.S. Cl.
CPC .......... *F01D 25/30* (2013.01); *F05D 2230/51* (2013.01); *F05D 2260/30* (2013.01)

(58) Field of Classification Search
CPC ............................. F01D 25/30; F01N 13/1811
See application file for complete search history.

(56) References Cited

U.S. PATENT DOCUMENTS

| | | | |
|---|---|---|---|
| 3,446,274 A | 5/1969 | Moore | |
| 6,371,238 B1 | 4/2002 | Svihla | |
| 7,975,488 B2 | 7/2011 | Farah | |
| 8,424,312 B2 | 4/2013 | Conete | |
| 11,125,156 B2 | 9/2021 | Zhang | |
| 11,143,000 B2 | 10/2021 | Li | |
| 11,459,954 B2 | 10/2022 | Yeung et al. | |
| 11,598,477 B1 * | 3/2023 | Seldenrust | F16M 3/00 |
| 12,044,357 B1 * | 7/2024 | Seldenrust | F01D 25/28 |
| 12,163,435 B1 * | 12/2024 | Morris | F02C 7/18 |
| 12,320,284 B1 * | 6/2025 | Morris | F01N 13/08 |
| 2016/0356219 A1 * | 12/2016 | Ferraris | F28F 9/028 |
| 2018/0238211 A1 * | 8/2018 | Kulkarni | F01K 23/103 |
| 2021/0025324 A1 * | 1/2021 | Morris | H02K 9/26 |

(Continued)

FOREIGN PATENT DOCUMENTS

| | | | |
|---|---|---|---|
| CN | 211692587 U | 10/2020 | |
| CN | 113787076 A * | 12/2021 | H02K 9/28 |

(Continued)

OTHER PUBLICATIONS

Written Opinion and International Search Report for Int'l. Patent Appln. No. PCT/US2025/011980, mailed Apr. 17, 2025 (15 pgs).

*Primary Examiner* — Topaz L. Elliott

(57) ABSTRACT

A modular exhaust device includes a plurality of panels, wherein, when configured in either a first state or a second state, the plurality of panels is configured to direct exhaust in a predetermined direction; and, when configured in the other of the first state or the second state, the plurality of panels is configured to act as an exhaust cover. The modular exhaust device further includes a coupling mechanism associated with at least one panel of the plurality of panels. The coupling mechanism is configured to secure the at least one panel in at least one of a first position associated with the first state or a second position associated with the second state.

18 Claims, 9 Drawing Sheets

(56) References Cited

U.S. PATENT DOCUMENTS

| | | | | |
|---|---|---|---|---|
| 2021/0079849 | A1* | 3/2021 | Yeung | F01D 25/30 |
| 2022/0412200 | A1 | 12/2022 | Zhang et al. | |
| 2023/0156974 | A1* | 5/2023 | Lewis, II | H05K 7/20745 361/679.46 |
| 2023/0349279 | A1* | 11/2023 | Zhang | F02C 7/26 |
| 2023/0349325 | A1* | 11/2023 | Morris | F02C 7/20 |
| 2024/0167396 | A1* | 5/2024 | Rodriguez-Ramon | E21B 43/2607 |
| 2024/0301777 | A1* | 9/2024 | Zhang | F02C 7/36 |

FOREIGN PATENT DOCUMENTS

| | | | | |
|---|---|---|---|---|
| CN | 118281729 | A * | 7/2024 | B01D 46/681 |
| EP | 1380707 | A1 * | 1/2004 | E04D 13/0358 |
| GB | 1093414 | A | 11/1967 | |
| JP | 2002089284 | A * | 3/2002 | F01D 25/28 |
| JP | 3916903 | B2 * | 5/2007 | |
| JP | 2009036495 | A | 2/2009 | |
| JP | 2023124296 | A * | 9/2023 | |

* cited by examiner

MODULAR EXHAUST DEVICE

TECHNICAL FIELD

The embodiments described herein are generally directed to the handling of exhaust from industrial systems including but not limited to gas turbine engine systems.

BACKGROUND

Industrial systems may produce high-temperature exhaust. Systems such as those used in industrial systems for power generation, manufacturing, and the oil and gas industry may generate exhaust as a byproduct of operation. The exhaust may damage surrounding parts of the industrial system that generates the exhaust, and/or surrounding equipment. Various attempt to solve this problem have been previously made.

For example, JP2009036495A, “Collapsible Duct and Seam Joint for Collapsible Duct,” directed towards a folding joint for a folding duct to eliminate heat insulation treatment and generation of waste materials related to the heat-insulating material but does not address the challenges discussed herein.

The present disclosure is directed toward overcoming this and other challenges discovered by the inventors.

SUMMARY

In an embodiment, an exhaust device, comprising a plurality of panels, wherein, when configured in either a first state or a second state, the plurality of panels is configured to direct exhaust in a predetermined direction. The exhaust device further includes a coupling mechanism associated with at least one panel of the plurality of panels, the coupling mechanism being configured to secure the at least one panel in at least one of a first position associated with the first state or a second position associated with the second state.

In another embodiment, a system comprising an exhaust system comprising at least one duct; and an exhaust device configured to fluidly couple to the at least one duct, the exhaust device being configured to be positioned in a first state and a second state. The exhaust device comprises a plurality of panels, wherein, when configured in either a first state or a second state, the plurality of panels is configured to direct exhaust in a predetermined direction; and a coupling mechanism associated with at least one panel of the plurality of panels, the coupling mechanism being configured to position the at least one panel in at least one of a first position associated with the first state or a second position associated with the second state. Further in this embodiment, the system comprises an enclosure positioned around the exhaust system, the enclosure including an aperture, the aperture being fluidly coupled to at least one of the exhaust device or the at least one duct of the exhaust system.

In an embodiment of method of using an exhaust device, the method comprises changing an exhaust device from a first state to a second state. The exhaust device comprises: a plurality of panels, wherein, when configured in either a first state or a second state, the plurality of panels is configured to direct exhaust in a predetermined direction; and a coupling mechanism associated with at least one panel of the plurality of panels, the coupling mechanism being configured to secure the at least one panel in at least one of a first position associated with the first state or a second position associated with the second state. In the embodiment, the changing comprises: changing a position of a first panel of the panels of the plurality of panels from a first position to a second position; and securing the at least one panel in the second position, wherein securing the at least one panel comprises at least one of removably coupling at least two panels of the plurality of panels to each other or removably coupling at least one panel of the plurality of panels to an exhaust-generating system.

DETAILED DESCRIPTION

Figure 1A:
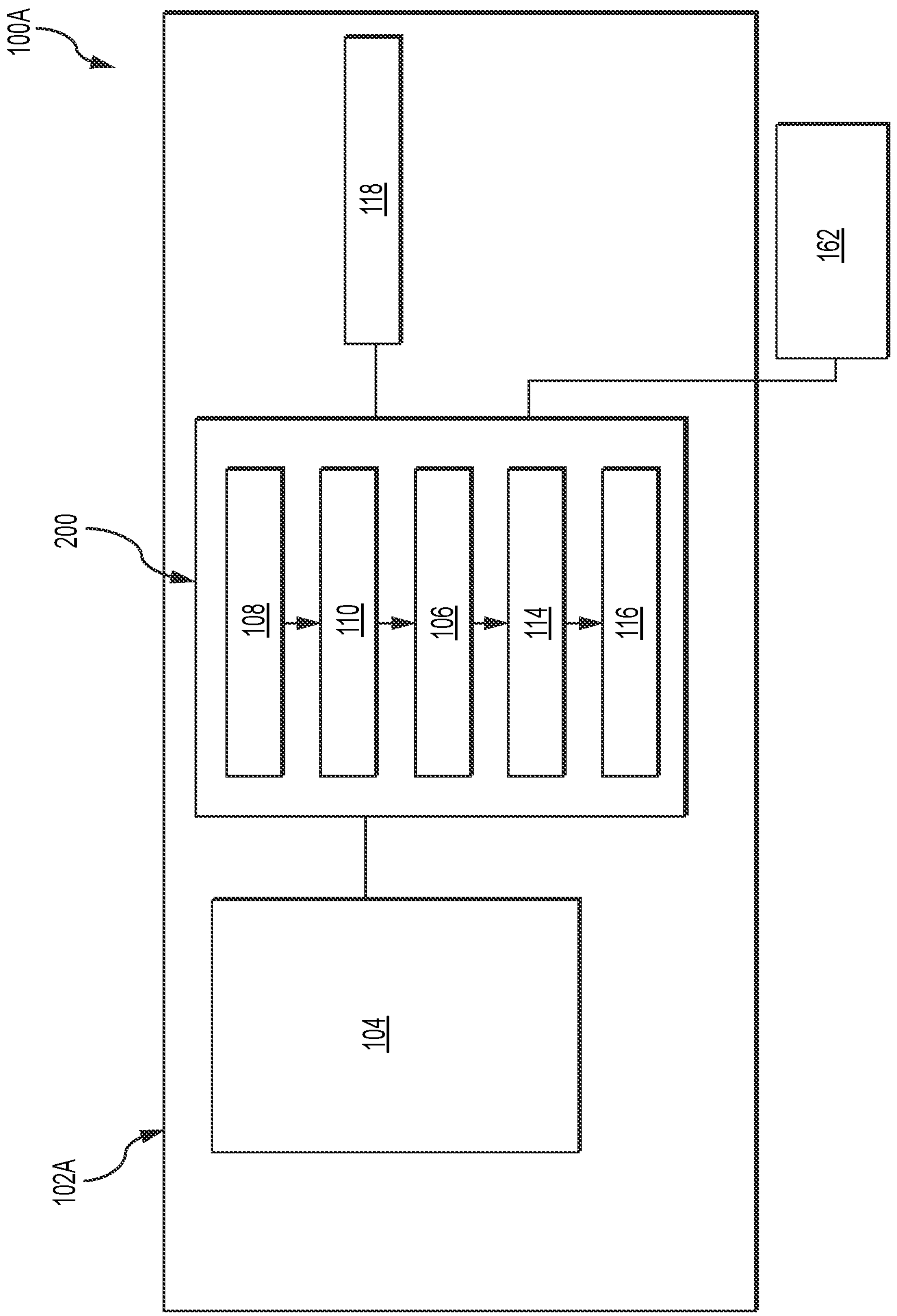
FIG. 1A illustrates a schematic diagram of a gas turbine engine, according to an embodiment of the present disclosure.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Unless explicitly excluded, the use of the singular to describe a component, structure, or operation does not exclude the use of plural such components, structures, or operations or their equivalents. The use of the terms “a” and “an” and “the” and “at least one” or the term “one or more,” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B” or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word “or” refers to any possible permutation of a set of items. For example, the phrase “A, B, or C” refers to at least one of A, B, C, or any combination thereof, such as any of: A; B; C;

A and B; A and C; B and C; A, B, and C; or multiple of any item such as A and A; B, B, and C; A, A, B, C, and C; etc.

Unless specifically stated or obvious from context, as used herein, the term "about" is understood as within a range of normal tolerance in the art, for example within 2 standard deviations of the mean. "About" can be understood as within 10%, 9%, 8%, 7%, 6%. 5%, 4%, 3%, 2%, 1%, 0.5%, 0.1%, 0.05%, or 0.01% of the stated value. Unless otherwise clear from the context, all numerical values provided herein are modified by the term "about."

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground). As used herein, the term "respective" signifies an association between members of a group of first components and members of a group of second components (e.g., A1 and B1; A2 and B2; . . . . AN and BN).

As used herein, "coupled" is understood to mean two or more elements, features, devices, systems, and/or components, which can be attached, engaged, paired, and/or connected to each other communicatively, operatively, mechanically, magnetically, electrically, chemically, fluidly, or combinations thereof.

As used herein, "exhaust" is understood to mean a byproduct of a process such as combustion, and may include gaseous, particulate, and/or liquid elements.

As used herein, "removably coupled" is understood to mean two or more elements, devices, features, systems, and/or components, which can be coupled to each other and then uncoupled without harming the previously coupled components, such that removably coupled elements can be coupled and recoupled a predetermined number of times without negatively impacting the functionality of the elements, devices, features, systems, and/or components individually or of the coupled configuration.

As used herein, "permanently coupled" is understood to mean two or more elements, devices, systems, features, components, which can be coupled to each other and then uncoupled, such that permanently coupled elements cannot be uncoupled and recoupled without damaging and/or having to refurbish or repair at least one element, device, feature, system, and/or component.

It should also be understood that the various components illustrated herein are not necessarily drawn to scale. In other words, the features disclosed in various embodiments may be implemented using different relative dimensions within and between components than those illustrated in the drawings.

Industrial Systems Including Modular Exhaust Device

FIG. 1A illustrates a first example schematic diagram of a gas turbine engine 100A, according to examples of the present disclosure. In an embodiment, gas turbine engine 100A comprises an inlet 108, a compressor 110, a combustor 106, a turbine 114, and an exhaust system 116. The exhaust generated by systems discussed herein may be referred to interchangeably as "exhaust" or as "a plurality of exhaust." A plurality of electronics 104 may be communicatively coupled to the gas turbine engine 100A and configured to control the operation of the gas turbine engine 100A. The plurality of electronics 104 may be further coupled to a fuel system 118 to operate and control the fuel system 118 which can be configured to deliver fuel to the combustor 106 of the gas turbine engine 100A. The plurality of electronics 104 may be wirelessly communicatively coupled to the gas turbine engine 100A via various wireless technologies.

A container 102A is positioned to encase the plurality of electronics 104, the gas turbine engine 100A (including at least the inlet 108, the compressor 110, the combustor 106, the turbine 114, the exhaust system 116), and the fuel system 118. An example of a modular exhaust device 162 is shown as well as being coupled to the exhaust system 116 and is discussed in detail below. As discussed herein, a "modular" exhaust device is used to describe a component of an industrial system, including but not limited to power generation equipment such as gas turbine engines, that is capable of being arranged in two or more states. The modularity of the exhaust devices discussed herein may be used to refer to the ability of the exhaust device to be coupled to both newly manufactured industrial equipment as well as retrofit to existing industrial equipment already fabricated and/or in the field. As discussed herein, each of the two or more states may be associated with at least one functionality of the modular exhaust device.

In one example, a first state of the modular exhaust device (which may be referred to herein as the "MED,") may be associated with a first functionality such as directing exhaust gas away from a container surface or other surface that could be damaged (e.g., warped, corroded, or otherwise degraded) by exposure to the exhaust gas. In another example, which may be combined with other examples and embodiments herein, a second state of the MED may be associated with a second functionality such as an exhaust cover. The MED may be configured as an exhaust cover in the second state, for example, when the industrial system is powered down, and/or during transportation of the industrial system. In other examples, the first and the second states may be associated with the opposite functionalities as compared to what is discussed above, and/or may include different or additional functionalities.

In some examples, one or more, including potentially all, of the components of gas turbine engine 100A may be made from stainless steel and/or durable, high-temperature materials known as "superalloys." A superalloy is an alloy that exhibits excellent mechanical strength and creep resistance at high temperatures, and further exhibits good surface stability, and corrosion and oxidation resistance.

Inlet 108 may deliver a working fluid (e.g., the primary gas, such as air) into an annular flow path 120F around longitudinal axis 120C. Working fluid flows through inlet 108 into compressor 110. The working fluid may flow into inlet 108 from a particular direction and at an angle that is substantially orthogonal to longitudinal axis 120C. In one example, the inlet 108 may be configured to receive the working fluid from any direction and at any angle that is appropriate for the gas turbine engine 100A. While the working fluid will primarily be described herein as air, it should be understood that the working fluid could comprise other fluids, including other gases, liquids, or combinations of gases and/or liquids.

Figure 1B:
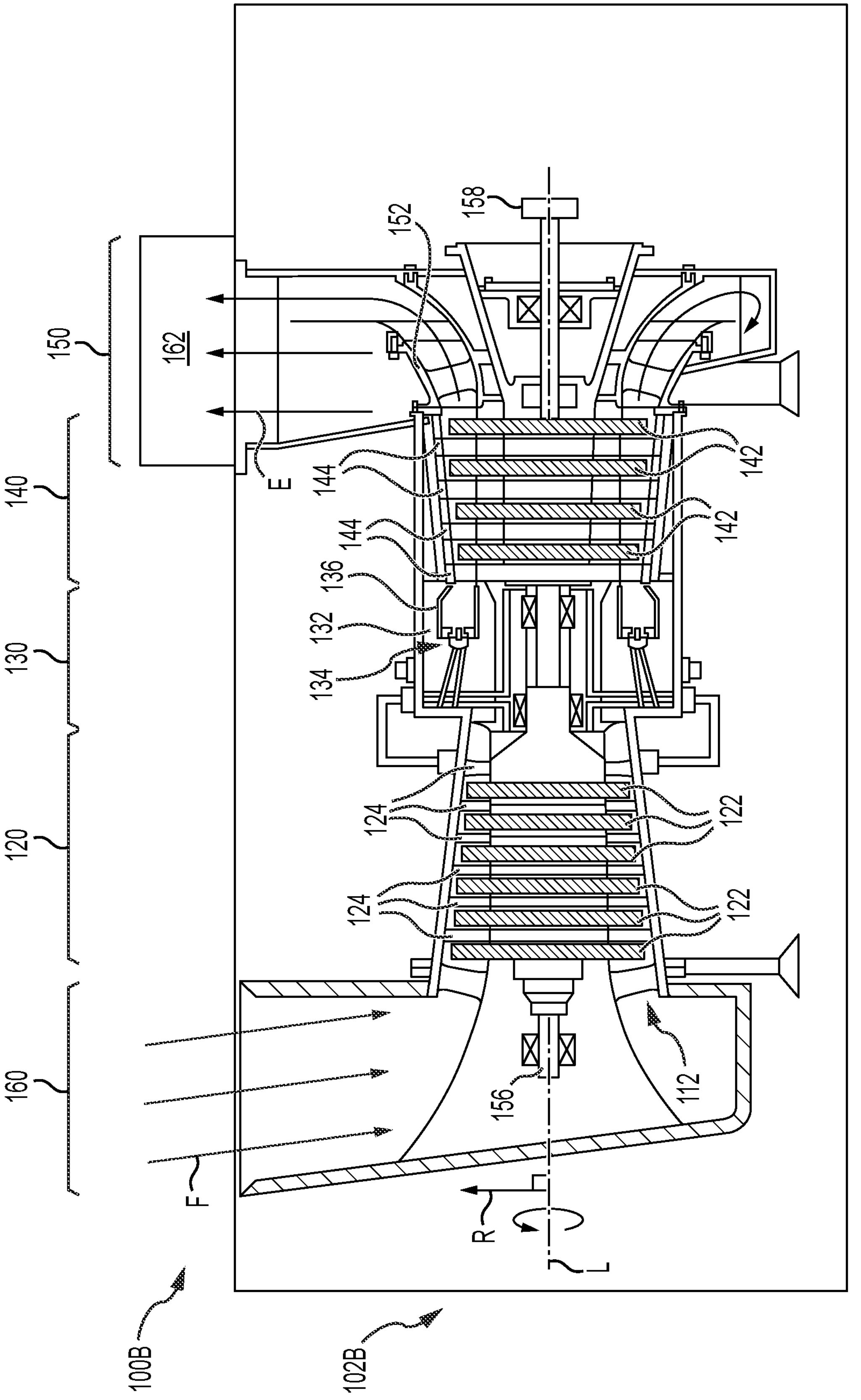
FIG. 1B illustrates another schematic diagram of a gas turbine engine, according to an embodiment of the present disclosure.

FIG. 1B illustrates a schematic diagram of a gas turbine engine 100B, according to an embodiment. A container 102B is shown as including at least the gas turbine engine 100B. Gas turbine engine 100B comprises a shaft 156 with a central longitudinal axis L. Various other components of gas turbine engine 100B are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100B comprises, from an upstream end to a downstream end, an inlet 160, a compressor 120, a combustor 130, a turbine 140, and an exhaust system 150 that may also be referred to as an "exhaust outlet." In addition, the downstream end of gas turbine engine 100B may comprise a power output coupling 158. One or more, including potentially all, of these components of gas turbine engine 100B may be made from stainless steel and/or durable, high-temperature materials known as "superalloys." A superalloy is an alloy that exhibits excellent mechanical strength and creep resistance at high temperatures, good surface stability, and corrosion and oxidation resistance.

Inlet 160 may funnel a working fluid F (e.g., the primary gas, such as air) into an annular flow path 112 around longitudinal axis L. Working fluid F flows through inlet 160 into compressor 120. The working fluid F is illustrated as flowing into inlet 160 from a particular direction and at an angle that is substantially orthogonal to longitudinal axis L. In other examples, the inlet 160 may be configured to receive working fluid F from any direction and at any angle relative to the annular flow path 112 that is appropriate for the particular application of gas turbine engine 100. While working fluid F will primarily be described herein as air, it should be understood that working fluid F could comprise other fluids, including other gases or combinations of gases, including hydrogen.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives the turbine 140.

The fuel delivered to the combustor 130 may include diesel, heating oil, coke oven gas, JP5, jet propellant, or kerosene. In some embodiments, liquid fuels may also include natural gas liquids (such as, for example, ethane, propane, butane, etc.), paraffin oil-based fuels (such as, JET-A), and gasoline. Gaseous fuels may include natural gas. In one example, the fuel includes methane. In another example, the fuel includes hydrogen. In still other examples, the fuel includes a mix of methane and hydrogen. In some embodiments, the gaseous fuel may also include alternate gaseous fuels such as, for example, liquefied petroleum gas (LPG), ethylene, landfill gas, sewage gas, ammonia, biomass gas, coal gas, refinery waste gas, etc. This listing of liquid and gaseous fuels is not intended to be an exhaustive list but merely exemplary. In general, any liquid or gaseous fuel known in the art may be delivered to the combustor 130 through the fuel injectors 134.

Turbine 140 may comprise one or more turbine rotor assemblies 142 and stator assemblies 144 (e.g., nozzles). Each turbine rotor assembly 142 may correspond to one of a plurality or series of stages. In some examples, the turbine 140 includes one state. In other examples, the turbine 140 includes two stages. In yet other examples, the turbine 140 includes three or more stages. Turbine 140 extracts energy from the combusting fuel-gas mixture as it passes through each stage. The energy extracted by turbine 140 may be transferred via power output coupling 158 (e.g., to an external system), as well as to compressor 120 via shaft 156.

The exhaust E from turbine 140 may flow into exhaust system 150. Exhaust system 150 may comprise an exhaust diffuser 152, which diffuses exhaust E, and an exhaust collector 154 which collects, redirects, and outputs exhaust E. It should be understood that exhaust E, which is output by exhaust collector 154, may be further processed, for example, to reduce harmful emissions, recover heat, and/or the like. Exhaust E is illustrated as flowing out of exhaust system 150 in a specific direction and at an angle that is substantially orthogonal to longitudinal axis L. However, in other examples, the exhaust system 150 may be configured to output exhaust E towards any direction and at any angle that is appropriate for the particular application of gas turbine engine 100. The MED 162 may be coupled to the exhaust collector 154 and have its state changed in various manners, as discussed in detail herein.

Figure 2:
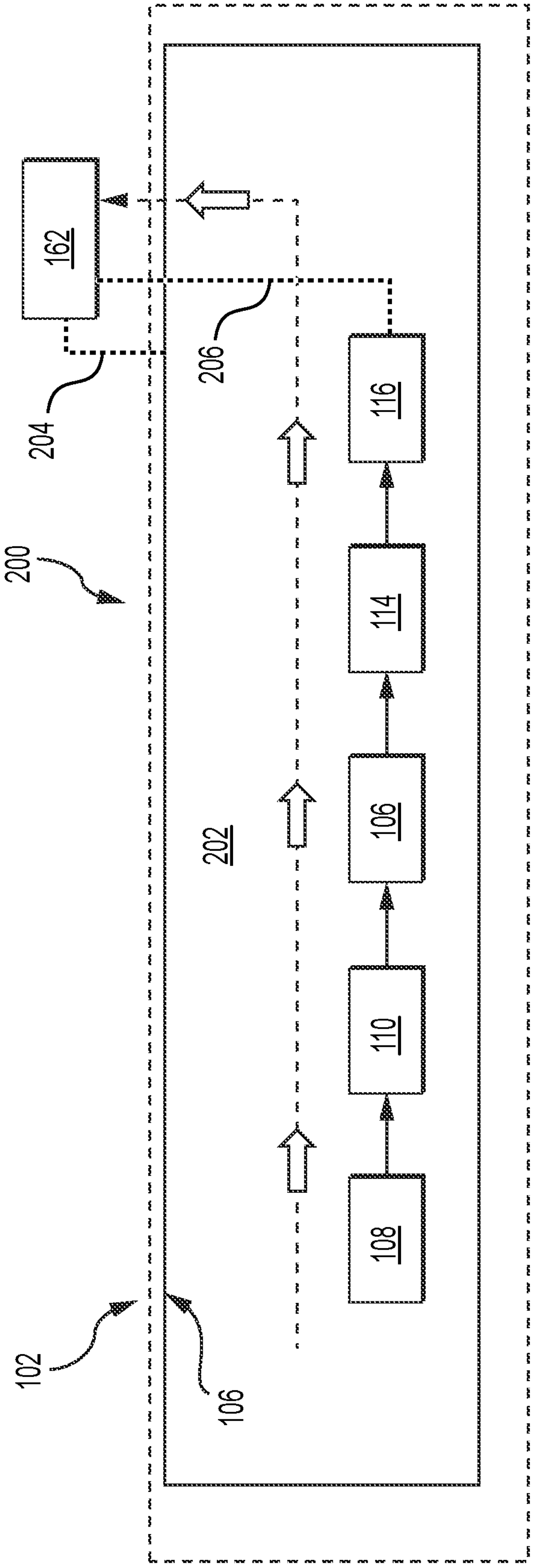
FIG. 2 illustrates a schematic diagram of airflow through a gas turbine engine, according to an embodiment of the present disclosure.

FIG. 2 is a schematic illustration of airflow through a gas turbine engine 200, according to embodiments of the present disclosure. The container 102, which may be similar to the containers 102A and 102B discussed above in FIGS. 1A and 1B, is positioned to include (encompass) a plurality of gas turbine engine components, as discussed above. In particular, the gas turbine engine 200 of FIG. 2 includes an inlet 108, a compressor 110, a combustor 106, a turbine 114, and an exhaust system 116.

The MED 162 is fluidly coupled to the exhaust system 116, as shown by connecting line 206. Thus, the exhaust generated by the processes, methods, and systems discussed herein flows through the exhaust system 116 to the MED 162 and then out into the surrounding atmosphere. In one example, the MED 162 is fluidly coupled to the gas turbine engine 200 by removably coupling the MED 162 to the container 102. In another example, the MED 162 is fluidly coupled to the gas turbine engine 200 by removably coupling the MED 162 to the exhaust system 116 via a duct, which is represented here by the connecting line 206. The fluid coupling promotes the transport of the exhaust in a predetermined direction. The MED 162 is configured to promote exhaust removal from the gas turbine engine 200 either via coupling it to the container 102, the exhaust system 116, or by a combination of couplings. Once coupled, the MED 162 directs the hot exhaust gas away from the container 102 to promote preservation of the integrity of the container 102. Without the MED 162, the exhaust gas from the exhaust system 116 may warp, corrode, or otherwise deteriorate the container 102.

Modular Exhaust Device Examples

Figure 3:
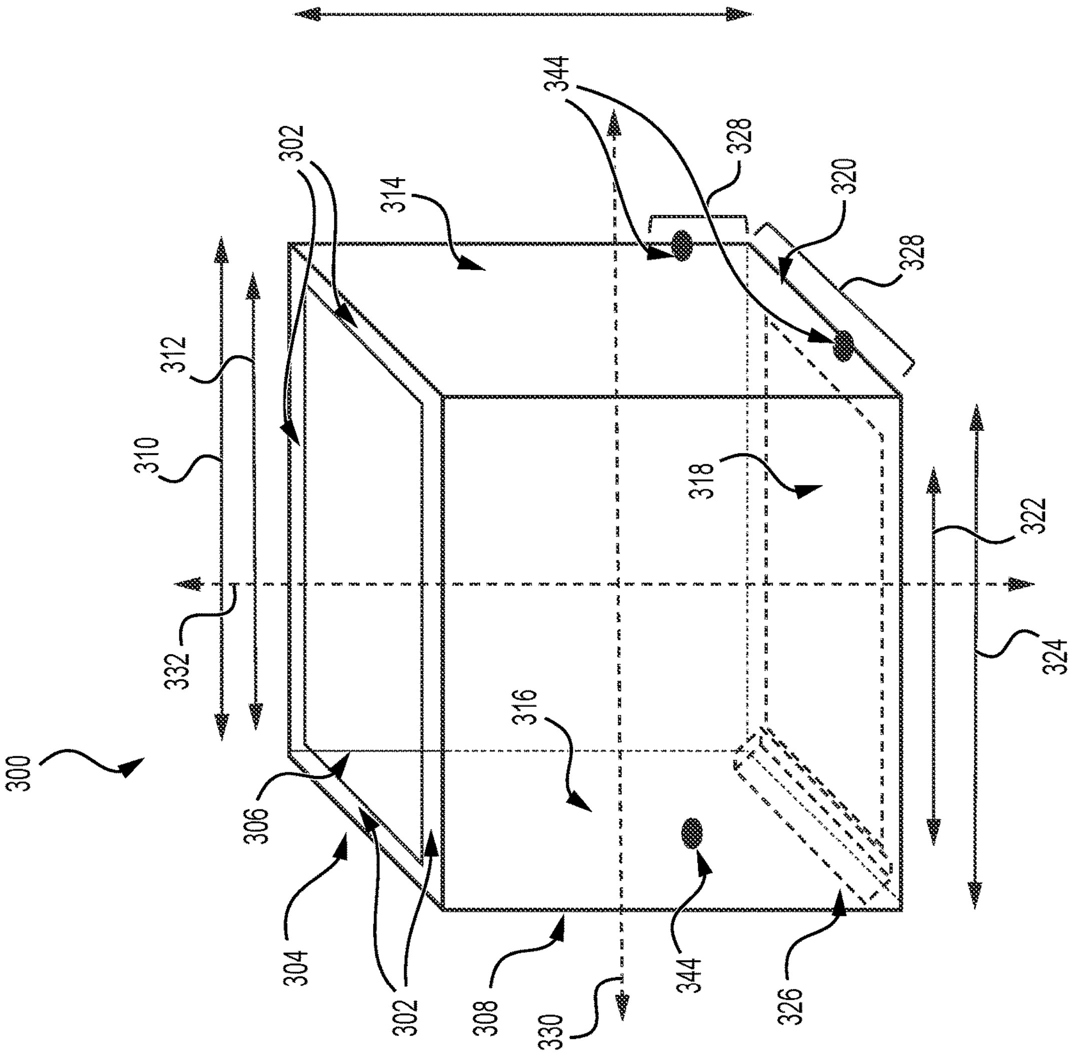
FIG. 3 illustrates a schematic drawing of example modular exhaust device (MED) according to embodiments of the present disclosure.

FIG. 3 illustrates a schematic drawing of example modular exhaust device (MED) 300 according to embodiments of the present disclosure. The MED 300 includes a plurality of panels 302 arranged around a central axis 332, the plurality of panels 302, when configured in an operational state as shown in FIG. 3, define a first end 304 opposite a second end 320. While four panels are shown in the plurality of panels 302 in FIG. 3, in other examples of the MED 300, less panels or more panels may be included in the plurality of panels 302. In various examples, not only may the number of panels change, but the geometry of the panels may change provided that, when configured in an operational state, the panels form a duct-like structure, and, when configured in the transportation state, the panels form an exhaust cover. In some examples, there may be 2-8 or more panels. In other examples, there may be 3-6 panels. In still other examples, there may be 4-5 panels.

When configured in the state as shown in FIG. 3, which is an operational state which may be referred to as a first state, a second state, or another state, the plurality of panels define a first aperture 306 in the first end 304 and a second aperture 318 in the second end 320, which are co-located along the central axis 332 to form a fluid flow path along which exhaust exits an exhaust system as discussed herein. The first end 304 has a first diameter 310, and the first aperture 306 is associated with a first aperture diameter 312. In one example, the first aperture diameter 312 is less than the first diameter 310 of the first end 304. The second end 320 has a second diameter 324, and the second aperture 318 is associated with a second aperture diameter 322. In one example, the second aperture diameter 322 is less than a second end diameter 324 of the second end 320.

In some examples, the fluid flow path is from the second end 320 to the first end 304, such that the second end 320 would be coupled to an exhaust-generating source such as the exhaust systems of the industrial equipment discussed herein. In some examples, due to the apertures (306, 318) in each respective end (304, 320), the first end 304 may be referred to as a "first surface" and the second end 320 may be referred to as a "second surface," such that the apertures (306, 318) do not extend across the entire first diameter 310 nor the second diameter 324.

The plurality of panels 302 extends from the first end 304 to the second end 320, having an exterior panel surface 314 and an interior panel surface 316. As used herein, the terms "exhaust" and "exhaust gas" may be used interchangeably to refer to what is produced by a gas turbine engine.

The MED 300 further includes one or more coupling regions 328. The one or more coupling regions 328 are configured to secure the MED 300 to an exhaust duct or other system where it may be desirable to capture, direct, and release exhaust or other matter away from the container and/or other equipment that may be damaged if exposed to the exhaust gas. In some examples, the coupling regions 328 are configured to secure two of more of the plurality of panels 302 to each other. In this example, the coupling regions 328 may be further configured to secure the MED 300 to the exhaust duct or container.

In some examples, the one or more coupling regions 328 comprise one or more coupling mechanisms 344. In one example, the coupling region 328 includes a plurality of coupling mechanisms 344 positioned circumferentially around the MED 300, for example, around the exterior panel surface 314 of the plurality of panels 302. Each coupling mechanism 344 may include one or more coupling elements, not shown here. In one example, a coupling region 328 may include a plurality of coupling mechanisms 344. In this example, each of the plurality of coupling mechanisms 344 may include a single coupling element such as a magnet. In another example, one or more of the coupling mechanisms 344 may include two or more coupling elements, such as a magnet and a tether used to attach the magnet to one or more parts of the MED 300.

The one or more coupling mechanisms are configured to removably and fluidly couple the MED 300 to the gas turbine engine systems as discussed herein mechanically, magnetically, chemically, electrically, or combinations thereof. In one example, the one or more coupling mechanisms include pressure-based mechanisms such as hydraulic mechanisms. In one example, the coupling region 328 is positioned on exterior panel surface 314 of the plurality of panels 302. In another example, the coupling region 328 is positioned through one of more of the plurality of panels 302. In this example, the coupling mechanisms 344 may be positioned partially (in a recess but without a through-hole) or completely (through-hole) through one or more of the plurality of panels 302. The one or more coupling mechanisms 344 may be positioned on either or both of the interior panel surface 316, the exterior panel surface 314, through one or more of the plurality of panels 302, on the first end 304, or on other surfaces or features of the MED 300. The coupling mechanisms 344 discussed herein may be configured in various manners, including being removably coupled to the MED 300. In another example, the coupling mechanisms 344 are permanently coupled to the MED 300 and configured to removably couple to the industrial equipment discussed herein. In yet another example, the coupling mechanisms 344 are permanently coupled to the industrial equipment and configured to be removably coupled to the MED 300. In yet another example, the coupling mechanisms 344 are removably coupled to both the MED 300 and to the industrial equipment discussed herein.

In some examples, the MED 300 or other MEDs discussed herein may be transitioned from the first state to the second state, and/or from the second state to the first state, without using any additional tooling. In other examples, a storage region 326 may be included in the MED 300. This storage region 326 may be located in various regions of the MED 300, including in the recess discussed below, or within a panel of the plurality of panels 302, or otherwise located for the safe and effective use of the MED 300. In some examples, a plurality of coupling mechanisms 344 may be stored in the storage region 326 with or without other tooling.

The MED 300 is shown in an operational state in FIG. 3. The transition to and/or from this state is discussed in detail below.

Figures 4A, 4B, 4C, 4D, 4E:
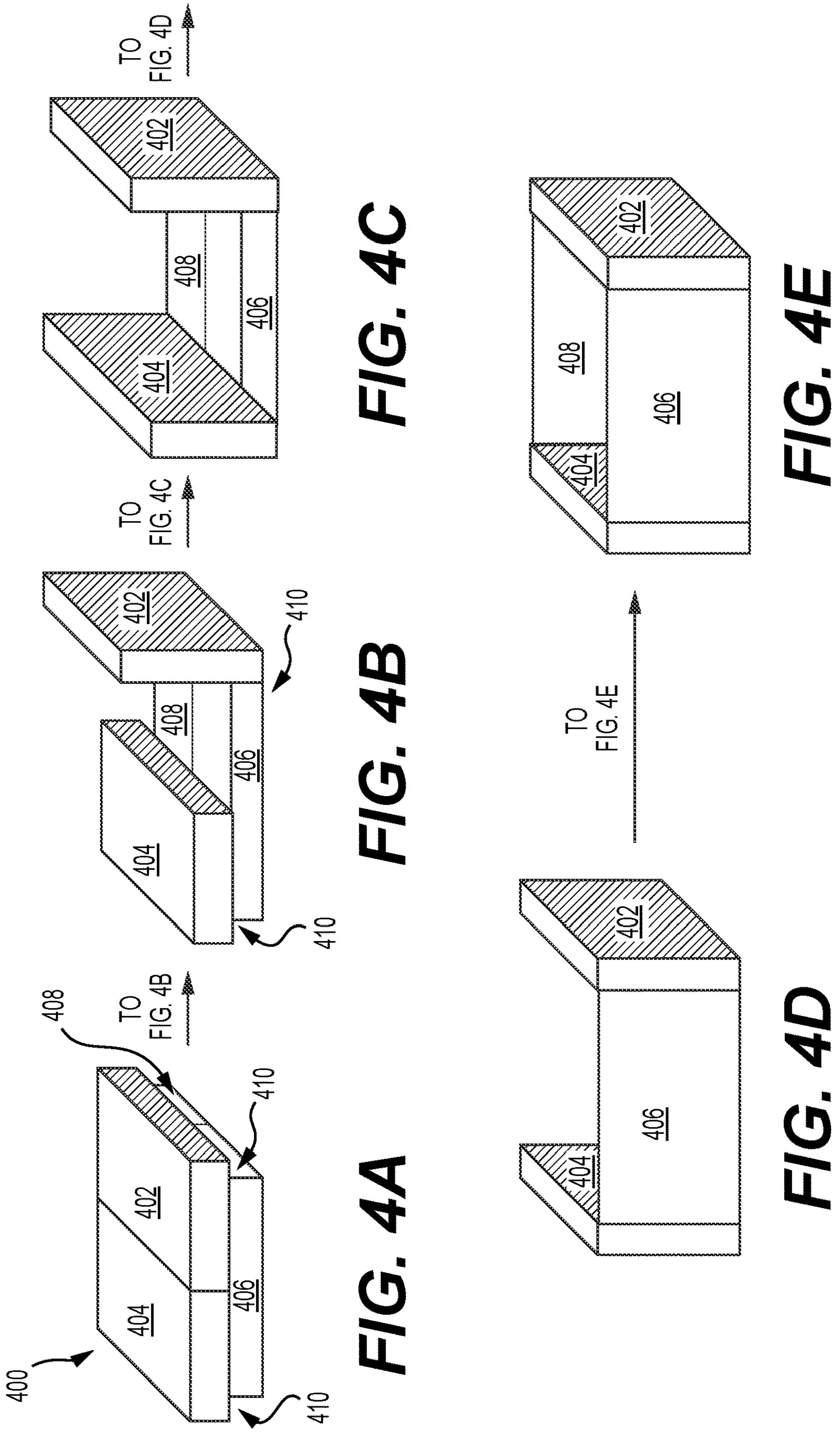
FIGS. 4A-4E show schematic illustrations of a stateful transition of a modular exhaust device (MED) according to embodiments of the present disclosure.

FIGS. 4A-4E show schematic illustrations of a stateful transition of the modular exhaust device (MED) 400, and other MEDs discussed herein. At FIG. 4A, the MED 400 is in a first, closed state, referred to herein as operation A. As discussed herein, the MED 400 shown at operation A can also be said to be in a transportation state. In this state at operation A, the MED 400 may function as an exhaust duct cover. Further in this state at operation A, the MED 400 is in condition for the underlying industrial equipment to be safely transported, for example, on a tractor-trailer or specially designed transportation rig. In this example, no separate exhaust cover over than the MED 400 may be included in the system to which the MED 400 is coupled (not shown here). At operation A, the plurality of panels (402, 404, 406, and 408) are configured in the first state. In one example, as shown in FIG. 4A at operation A, a recess 410 may be formed by the overlap of a first set (402, 404) of panels of the plurality of panels (402, 404, 406, 408) and a second set (406, 408) of panels.

Figure 5A:
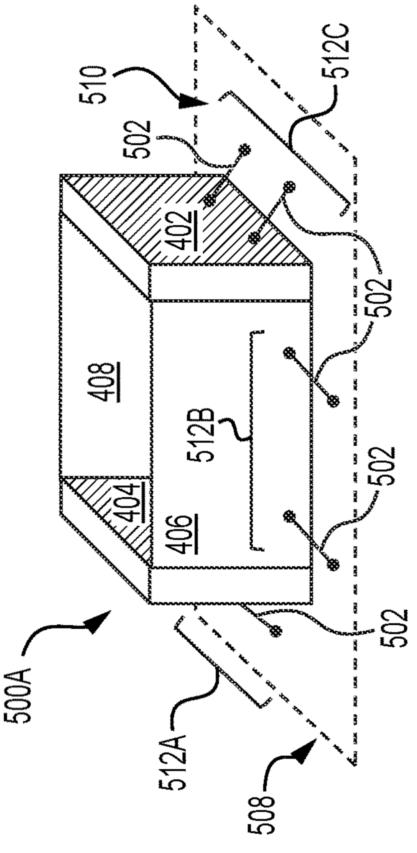
FIGS. 5A-5C illustrate schematic drawings of modular exhaust devices according to embodiments of the present disclosure.
Figure 5B:
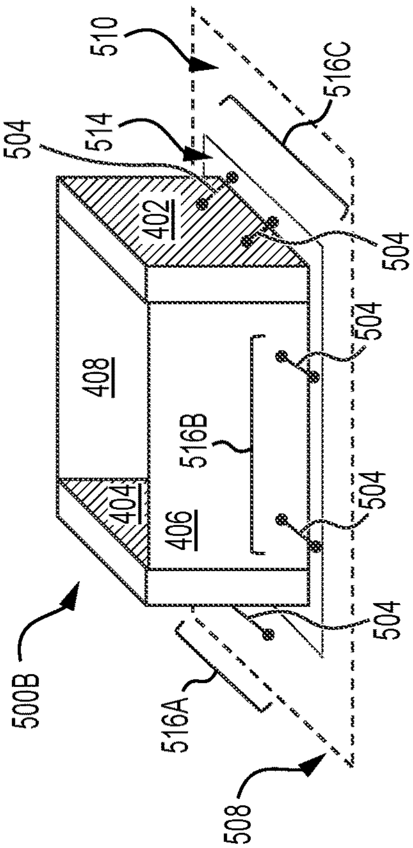
Figure 5C:
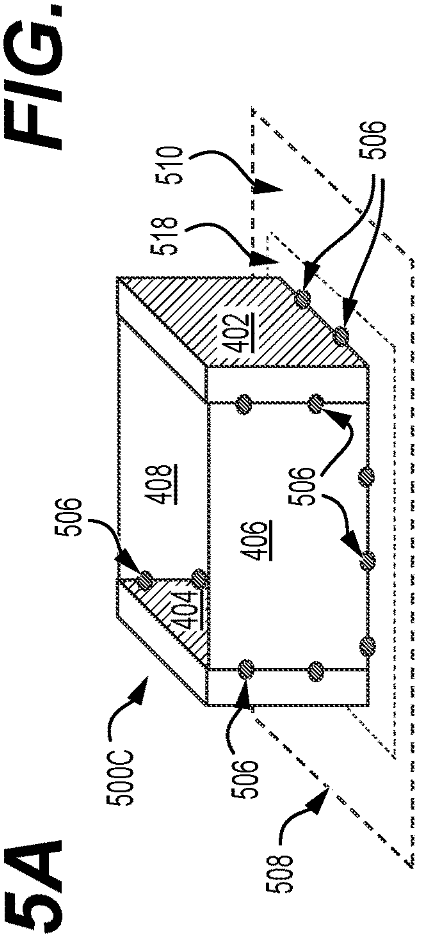

At FIG. 4B, a first panel 402 of the plurality of panels (402, 404, 406, 408) is changed from a first position associated with the first state shown at operation A to second position associated with a second state as a part of the transition of the MED 400 from the first state to the second state, the second state referred to herein as operation B. The first panel 402 is shown as fitting into a recess 410 in FIG. 4B. In one example, the recess 410 may be used to position and secure the first panel 402 in the second state. In other examples, as shown in FIGS. 5A-5C and discussed below, additional, or alternative methods of transitioning, positioning, and securing the MED 400 or other MEDs discussed herein, such as MEDS 300, 500A, 500B, 500C, or 608, from the first state to the second state are shown. The recess 410 may include at least one mechanical mechanism, magnetic mechanism, electrical mechanism, chemical mechanism, or combinations of mechanism and/or means used to promote the transition of the MED 400 from the first state at operation A to the second state at operation B.

At FIG. 4C, a second panel 404 of the plurality of panels (402, 404, 406, 408) is changed from a first position associated with the first state shown at operation A to a second position associated with the second state as a part of the transition of the MED 400 from the first state to the second state, the second state referred to herein as operation C. The second panel 404 is shown as fitting into the recess 410 when configured in the second position. In one example, the recess 410 may be used to position and secure the second panel 404 in the second state. In other examples, as shown in FIGS. 5A-5C and discussed below, additional, or alternative methods of transitioning, positioning, and securing the MED 400 or other MEDs discussed herein, such as MEDS 300, 500A, 500B, 500C, or 608, from the first state to the second state are shown.

At FIG. 4D, a third panel 406 of the plurality of panels (402, 404, 406, 408) is changed from a first position associated with the first state shown at operation A to a second position associated with the second state of the MED 400 as a part of the transition of the MED 400 from the first state to the second state, the second state referred to herein as operation D. The third panel 406 may be secured in place in the second state by a variety of mechanisms as discussed herein. In other examples, as shown in FIGS. 5A-5C and discussed below, additional, or alternative methods of transitioning, positioning, and securing the MED 400 or other MEDs discussed herein, such as MEDS 300, 500A, 500B, 500C, or 608, from the first state to the second state are shown.

At FIG. 4E, a fourth panel 408 of the plurality of panels (402, 404, 406, 408) is changed from a first position associated with the first state shown at operation A to a second position associated with the second state of the MED 400 as a part of the transition of the MED 400 from the first state to the second state, the second state referred to herein as operation E. The fourth panel 408 may be secured in place in the second state by a variety of mechanisms as discussed herein. In other examples, as shown in FIGS. 5A-5C and discussed below, additional or alternative methods of transitioning, positioning, and securing the MED 400 or other MEDs discussed herein, such as MEDS 300, 500A, 500B, 500C, or 608, from the first state to the second state are shown. The plurality of panels (402, 404, 406, 408) shown at operation E can be said to be configured in an open or operational state.

FIGS. 4A-4E thus illustrates one example of how the MED 400 can be changed from a first state at operation A to a second state at operation E. It is to be understood that the MED 400 can be transitioned back from the second state at operation E to the first state at operation A by performing the transitions between the operations A-E discussed above in reverse, e.g., changing the positions of the panels (402, 404, 406, 408) from the second position to the first position. In one example, the first state shown at operation A can be described at the closed state where the MED 400 is configured to act as an exhaust cover. This may be desirable, for example, when the associated industrial system (not shown here) is not operating, including when that associated industrial system may be transported among and between locations. During transportation, it may be desirable to have the MED 400 configured in the first state such that it does not create a safety hazard for the industrial system, including in the example of a mobile/transportable system that may be transported under bridges, through tunnels, and/or in other areas including height barriers/restrictions.

While the MED 400 shown in FIGS. 4A-4E includes four panels, a first pair of which (402, 404) is configured to collapse and fold on top of the second pair of panels (406, 408), in other examples, other geometries are possible. Other geometries may include a triangular configuration, a polygonal configuration, a conical or parabolic configuration, windowpane (no overlapping panels) or a pinwheel configuration (panels overlapping in a manner to allow for simultaneous position change). In some examples, the panels are configured to open in pairs or simultaneously, as discussed in detail below at least in the method of FIGS. 7A-7C.

FIGS. 5A-5C illustrate schematic drawings of modular exhaust devices (500A, 500B, 500C) configured in an operational state of the MEDs, which could be described as either a first state or a second state. The MEDs (500A, 500B, 500C) are each coupled to a container 508, similar to the container 102A discussed above. An "operational state" of the MED, as discussed herein is a state in which the MED is configured when the underlying industrial equipment is operational, e.g., when the MED is functioning to direct exhaust gas away from a container 508, shown in FIGS. 5A-5C as a partial view of the top surface 510 of the container 508.

FIG. 5A shows a first MED 500A comprising the plurality of panels (402, 404, 406, 408). The first MED 500A is configured in the operational state shown in FIG. 5A, in contrast to the transportation state shown at operation E in FIG. 4E and discussed herein. As discussed herein, a "transportation state" of the MED is a state in which the MED is configured when the underlying industrial equipment is non-operational, including but not limited to when the underlying equipment is being prepared for transportation between locations or is actively in transit between locations.

The first MED 500A is shown to be seated on the top surface 510 of the container 508. A plurality of coupling regions 512A, 512B, and 512C are shown. A fourth coupling region, not shown here for ease of illustration, may be located opposite the coupling region 512B on the panel 408. Each coupling region 512A, 512B, 512C includes one or more coupling mechanisms 502. Each coupling mechanism 502 shown in FIG. 5A couples at least one panel (402, 404, 406, 408) to the top surface 510 of the container 508. This is in contrast to examples herein where the plurality of panels of the MED may be secured to a recess (FIG. 5B), and/or secured to each other with or without a recess (FIG. 5C). This coupling mechanism 502 may be a mechanical mechanism, electrical mechanism, chemical mechanism, magnetic mechanism, or combinations thereof, and may include one or more elements, as discussed above at least in FIG. 3. In some examples, each coupling mechanism 502 of the first MED 500A may include the same means of coupling. In another example, one or more coupling mechanism 502 of the first MED 500A includes a different means of coupling as compared to at least one other coupling mechanism 502.

In some examples, the coupling mechanisms (502 or otherwise) discussed herein can be engaged (to configure the first MED 500A in the operational state) or disengaged (to configure the first MED 500A in the transportation state) manually, without the use of tooling. In other examples, the coupling mechanisms (502 or otherwise) discussed herein can be engaged (to configure the first MED 500A in the operational state) or disengaged (to configure the first MED 500A in the transportation state) manually with the use of tooling. An at least one tool (such as a hammer, wrench, screwdriver, or other tool or multi-tool) may or may not be stored in the storage region 326 discussed above in FIG. 3. In still other examples, the coupling mechanisms (502 or otherwise) discussed herein can be engaged (to configure the first MED 500A in the operational state) or disengaged (to configure the first MED 500A in the transportation state) automatically in response to a trigger. This is discussed in more detail in at least FIGS. 7A-7C.

In one example, a single coupling region (512A, 512B, 512C, or the fourth coupling region not shown here) may be used to secure the first MED 500A in the operational state shown in FIG. 5A. In another example, two or more coupling regions (512A, 512B, 512C, or the fourth coupling region not shown here) may be used to secure the first MED 500A in the operational state shown in FIG. 5A. In one example when two or more coupling mechanisms 502 are included in a coupling region as discussed herein, every coupling mechanism 502 in that coupling region (e.g., 512A, 512B, 512C, or the fourth coupling region not shown here) is engaged when the first MED 500A is in the operational state shown in FIG. 5A. In another example, when two or more coupling mechanisms 502 are included in a coupling region as discussed herein, less than every coupling mechanism 502 in that coupling region (e.g., 512A, 512B, 512C, or the fourth coupling region not shown here) is engaged when the first MED 500A is in the operational state shown in FIG. 5A. In yet another example, when two or more coupling mechanisms 502 are included in a coupling region as discussed herein, a single coupling mechanism 502 in that coupling region (e.g., 512A, 512B, 512C, or the fourth coupling region not shown here) is engaged when the first MED 500A is in the operational state shown in FIG. 5A.

FIG. 5B shows a second MED 500B comprising the plurality of panels (402, 404, 406, 408). The second MED 500B is configured in the operational state shown in FIG. 5B, in contrast to the transportation state shown at operation E in FIG. 4E and discussed above. The second MED 500B is shown to be seated on the top surface 510 of the container 508. A plurality of coupling regions 512A, 512B, and 512C are shown. A fourth coupling region, not shown here for ease of illustration, may be located opposite the coupling region 512B on the panel 408.

Each coupling region 512A, 512B, 512C includes one or more coupling mechanisms 502. Each coupling mechanism 504 shown in FIG. 5B couples at least one panel (402, 404, 406, 408) to a recess 514. In one example, the recess 514 may be said to be formed in the container 508. In another example, the recess may be said to be formed in between the container 508 and the exhaust system (not shown here) which feeds exhaust to the second MED 500B. In yet another example, the recess 514 may be formed in the exhaust system.

FIG. 5B is in contrast to examples herein where the plurality of panels of the MED may be secured to the top surface 510 of the container 508, and/or secured to each other with or without a recess (FIG. 5C). Similarly, to what is discussed in FIG. 5A with respect to the coupling mechanisms 502, the coupling mechanism(s) 504 may be mechanical, electrical, chemical, magnetic, or combinations thereof, and may include one or more elements. In some examples, each coupling mechanism 504 of the second MED 500B may include the same means of coupling. In another example, one or more coupling mechanism 504 of the second MED 500B includes a different means of coupling as compared to at least one other coupling mechanism 504.

In some examples, the coupling mechanisms (504 or otherwise) discussed herein can be engaged (to configure the second MED 500B in the operational state) or disengaged (to configure the second MED 500B in the transportation state) manually, without the use of tooling. In other examples, the coupling mechanisms (504 or otherwise) discussed herein can be engaged (to configure the second MED 500B in the operational state) or disengaged (to configure the second MED 500B in the transportation state) manually with the use of tooling. The tooling may or may not be stored in the storage region 326 discussed above in FIG. 3. In still other examples, the coupling mechanisms (504 or otherwise) discussed herein can be engaged (to configure the second MED 500B in the operational state) or disengaged (to configure the second MED 500B in the transportation state) automatically in response to a trigger. This is discussed in more detail in at least FIGS. 7A-7C.

In one example, a single coupling region (516A, 516B, 516C, or the fourth coupling region not shown here) may be used to secure the second MED 500B in the operational state shown in FIG. 5B. In another example, two or more coupling regions (516A, 516B, 516C, or the fourth coupling region not shown here) may be used to secure the second MED 500B in the operational state shown in FIG. 5B. In one example when two or more coupling mechanisms 504 are included in a coupling region as discussed herein, every coupling mechanism 504 in that coupling region (e.g., 516A, 516B, 516C, or the fourth coupling region not shown here) is engaged when the second MED 500B is in the operational state shown in FIG. 5B. In another example, when two or more coupling mechanisms 504 are included in a coupling region as discussed herein, less than every coupling mechanism 504 in that coupling region (e.g., 516A, 516B, 516C, or the fourth coupling region not shown here) is engaged when the second MED 500B is in the operational state shown in FIG. 5B. In yet another example, when two or more coupling mechanisms 504 are included in a coupling region as discussed herein, a single coupling mechanism 504 in that coupling region (e.g., 516A, 516B, 516C, or the fourth coupling region not shown here) is engaged when the second MED 500B is in the operational state shown in FIG. 5B.

FIG. 5C shows a third MED 500C comprising the plurality of panels (402, 404, 406, 408). The third MED 500C is configured in the operational state shown in FIG. 5C, in contrast to the transportation state shown at operation E in FIG. 4E and discussed above. FIG. 5C shows an optional recess 518 which the third MED 500C may be coupled when in at least one of the operational state or the transportation state. In another example, the third MED 500C is shown to be seated on the top surface 510 of the container 508 and the recess is not present.

One or more coupling mechanisms 506 may be used to change the state of the third MED 500C. In one example, regardless of whether the third MED 500C is seated in the optional recess 518 or coupled to the top surface 510 of the container 508, at least one coupling mechanism 506 shown in FIG. 5C couples at least one panel (402, 404, 406, 408) to another panel. In one example, the optional recess 518 may be said to be formed in the container 508. In another example, the optional recess 518 may be said to be formed in between the container 508 and the exhaust system (not shown here) which feeds exhaust to the third MED 500C. In yet another example, the optional recess 518 may be formed in the exhaust system.

Similarly, to what is discussed in FIGS. 5A and 5B with respect to the coupling mechanisms 502 and 504, respectively, the coupling mechanism(s) 506 may be mechanical, electrical, chemical, magnetic, or combinations thereof, and may include one or more elements. In some examples, each coupling mechanism 506 of the third MED 500C may include the same means of coupling. In another example, one or more coupling mechanism 506 of the third MED 500C includes a different means of coupling as compared to at least one other coupling mechanism 506.

In some examples, the coupling mechanisms (506 or otherwise) discussed herein can be engaged (to configure the third MED 500C in the operational state) or disengaged (to configure the third MED 500C in the transportation state) manually, without the use of tooling. In other examples, the coupling mechanisms (506 or otherwise) discussed herein can be engaged (to configure the third MED 500C in the operational state) or disengaged (to configure the third MED 500C in the transportation state) manually with the use of tooling. The tooling may or may not be stored in the storage region 326 discussed above in FIG. 3. In still other examples, the coupling mechanisms (504 or otherwise) discussed herein can be engaged (to configure the third MED 500C in the operational state) or disengaged (to configure the third MED 500C in the transportation state) automatically in response to a trigger. This is discussed in more detail in at least FIGS. 7A-7C.

In one example, a single coupling region (518A, 518B, 518C, or the fourth coupling region not shown here) may be used to secure the third MED 500C in the operational state shown in FIG. 5C. In another example, two or more coupling regions (518A, 518B, 518C, or the fourth coupling region not shown here) may be used to secure the third MED 500C in the operational state shown in FIG. 5C. In one example when two or more coupling mechanisms 506 are included in a coupling region as discussed herein, every coupling mechanism 506 in that coupling region (e.g., 518A, 518B, 518C, or the fourth coupling region not shown here) is engaged when the third MED 500C is in the operational state shown in FIG. 5C. In another example, when two or more coupling mechanisms 506 are included in a coupling region as discussed herein, less than every coupling mechanism 506 in that coupling region (e.g., 518A, 518B, 518C, or the fourth coupling region not shown here) is engaged when the third MED 500C is in the operational state shown in FIG. 5C. In yet another example, when two or more coupling mechanisms 506 are included in a coupling region as discussed herein, a single coupling mechanism 506 in that coupling region (e.g., 518A, 518B, 518C, or the fourth coupling region not shown here) is engaged when the third MED 500C is in the operational state shown in FIG. 5C.

FIGS. 6A-6E illustrate an industrial system having a modular exhaust device (MED) according to embodiments of the present disclosure. The FIGS. 6A-6E correspond to the operations A-E of FIGS. 4A-4E, so the same panel numbers are used.

Figure 6B:
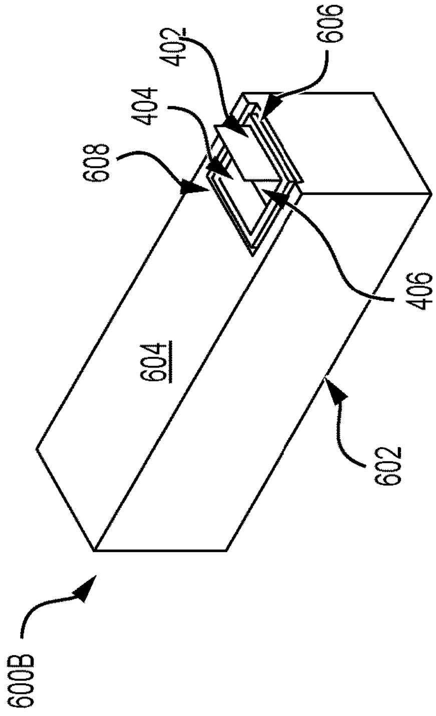
FIGS. 6A-6E illustrate an industrial system having a modular exhaust device (MED) according to embodiments of the present disclosure.
Figure 6A:
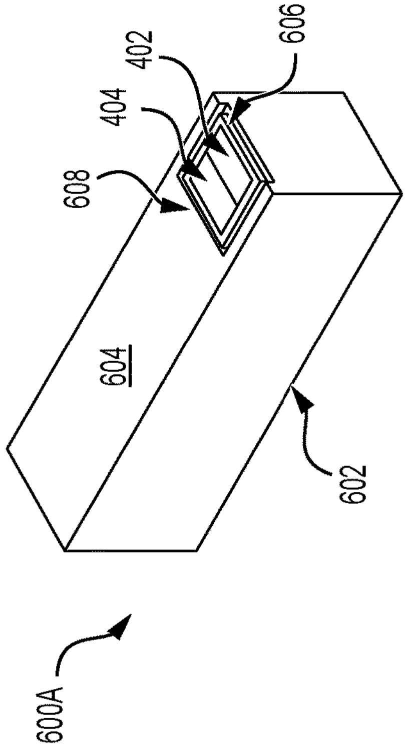

FIG. 6A shows operation A from FIG. 4A, wherein an MED 608 having a plurality of panels (402, 404 shown, 406, 408, not shown here) is removably coupled to a recess 606 in a top surface 604 of a container 602. The container 602 may include a power generation apparatus such as a gas turbine engine, or another exhaust-generating apparatus. As shown in FIG. 6A, the MED 608 is in a first state that may be described as a transportation state. When the MED 608 is configured in the transportation state, it may act as an exhaust cover in addition to being configured for travel of the container 602. A container 602 may be configured to be transportable, for example, to provide power to a remote building site, oil and gas platform, and/or after a natural disaster or other circumstances where power generation may be desirable.

FIG. 6B shows the MED 608 after operation B from FIG. 4B is executed such that a first panel 402 of the plurality of panels (402, 404, 406, 408) is changed from the first state to a second state. When each panel of the plurality of panels (402, 404, 406, 408) has been changed from the first (transportation) state to a second (operational) state, the MED 608 can be said to be configured in the second (operational) state. The first panel 402 may be secured in the second state via one of more of the coupling mechanisms discussed above.

Figure 6E:
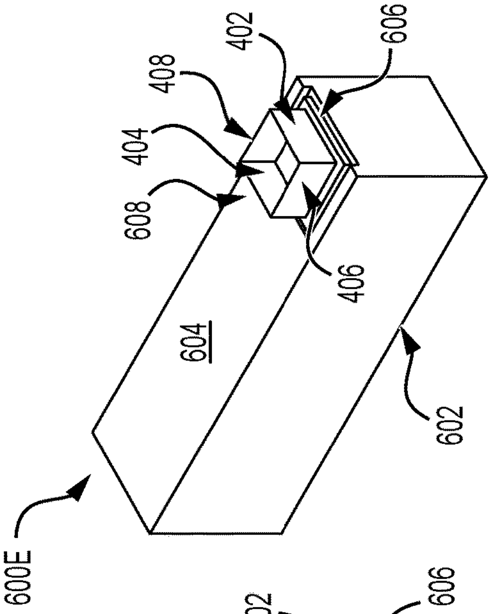
Figure 6D:
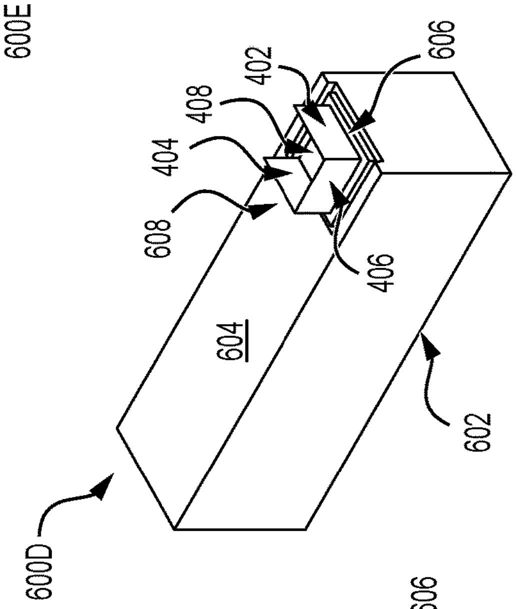
Figure 6C:
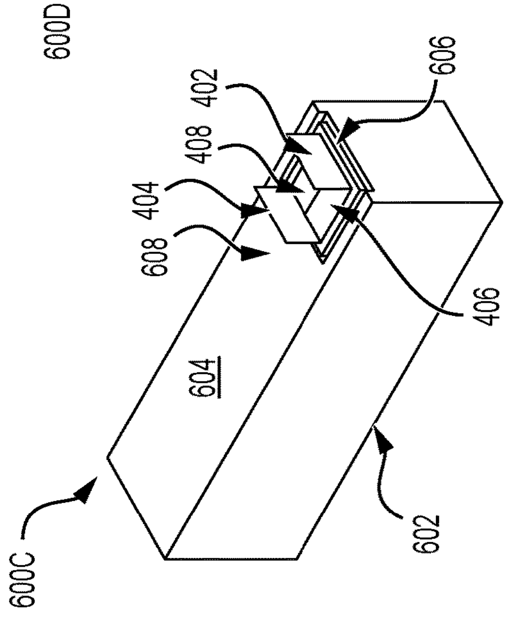

FIG. 6C shows the MED 608 after operation C from FIG. 4C is executed such that a second panel 404 of the plurality of panels (402, 404, 406, 408) is changed from the first state to a second state. The second panel 404 may be secured in the second state via one of more of the coupling mechanisms discussed above.

FIG. 6D shows the MED 608 after operation D from FIG. 4D is executed such that a third panel 406 of the plurality of panels (402, 404, 406, 408) is changed from the first state to a second state. The third panel 406 may be secured in the second state via one of more of the coupling mechanisms discussed above.

FIG. 6E shows the MED 608 after operation E from FIG. 4E is executed such that a fourth panel 408 of the plurality of panels (402, 404, 406, 408) is changed from the first state to a second state. The fourth panel 408 may be secured in the second state via one of more of the coupling mechanisms discussed above. FIG. 6E shows the MED 608 as configured in the second state, which, in this example, is the operational state of the equipment the MED 608 is coupled thereto. The MED 608 is thus configured to direct exhaust away from the container 602 which extends the life of the container 602.

Further, in one example, the MED 608 can be changed from a first state to a second state and/or from the second state to the first state without using any additional tooling, that is, using only what is included in the MED 608 and the container 602 or exhaust system (not shown here) or other component to which the MED 608 is configured to removably couple. In this example, if a manual state change is executed, the party or parties executing the state change would not need to bring any tooling, for example, up a ladder to execute the state change. This is a safety improvement since no tooling would be used in the state change and thus no tooling would need to be transported to the top of the container 602.

In another example, if a manual state change is executed, the party or parties executing the state change would not need to bring any tooling, for example, up a ladder or otherwise potentially compromise safety during the state change, since all tooling or other elements used in the state change may be stored in the storage region such that the tooling and/or other elements would not be carried up to the top of the package to execute the state change.

In yet another example, the state change shown in FIGS. 6A-6E may be automatically executed, e.g., without human intervention, in response to a trigger. The trigger may include an equipment shutdown, equipment slow-down, equipment start-up, equipment set up at a site, equipment removal from a site, or other operational parameters or events. In still another example, the trigger causing the state change shown in FIGS. 6A-6E (or the reverse thereof) may be in response to a manual trigger that automatically executes the state change. As discussed herein, the automatic execution of a state change refers to changing a state of the MED 608 from a first state to a second state, where the first state is either an open, operational state or a closed, transportation state, and the second state is the other of the operational state or the transportation state. The manual trigger may be a button, switch, or other command. This is discussed in detail below in FIGS. 7A-7C.

INDUSTRIAL APPLICABILITY

Industrial equipment, including industrial power generation equipment such as gas turbines, generate exhaust and the related soundwaves. The exhaust gas released may be at a temperature high enough to damage areas of equipment associated with the exhaust, and/or may contain corrosive or other undesirable elements. Accordingly, the solution discussed herein directs the exhaust gas away from the surrounding equipment to which is it coupled and may further be used to direct it away from other nearby obstacles.

Further, the modular exhaust devices discussed herein may act as both an exhaust duct and as an exhaust cover. This may be, for example, when the MED is coupled to a mobile industrial power generation unit such as a gas turbine engine. Mobile power generation units are configured to be transportable to remote and otherwise power-deficient locations, as well as any other geographic location that may benefit from power generation. Part of the transportability of the mobile power units includes the ease of configuring the unit for use and then configuring the unit for transportation, including both safety and efficiency of setup and removal processes. In some examples discussed herein, the industrial equipment does not include an exhaust cover, rather, the MED(s) discussed herein act as the exhaust cover when configured in a transportation state.

Figure 7A:
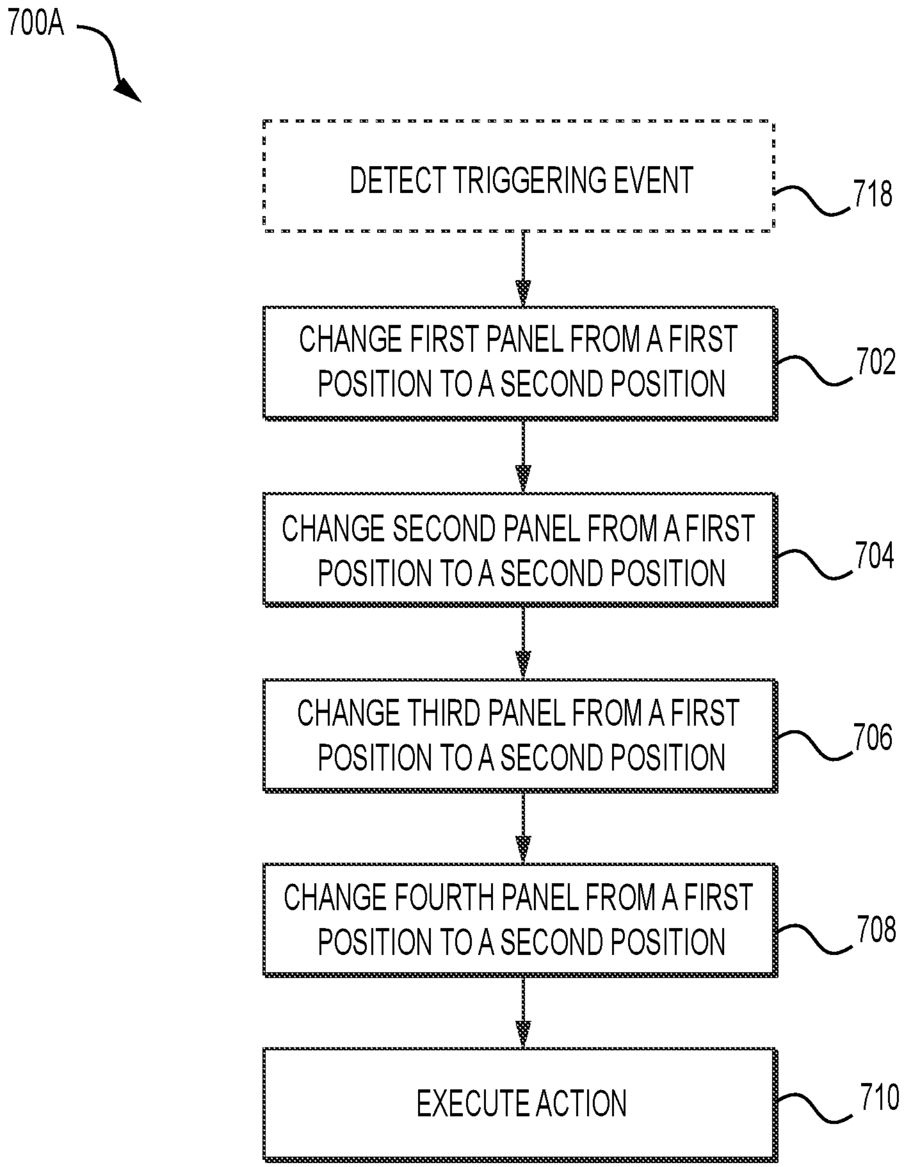
FIGS. 7A-7C are flow charts illustrating methods of operation of the modular exhaust devices discussed herein, according to embodiments of the present disclosure.
Figure 7B:
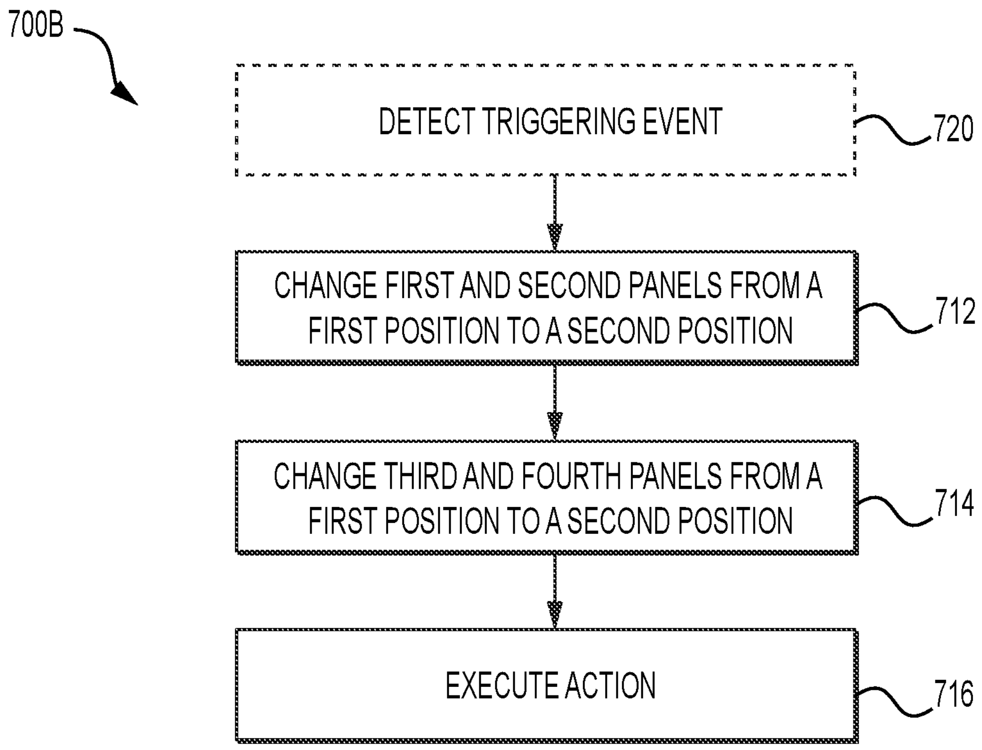
Figure 7C:
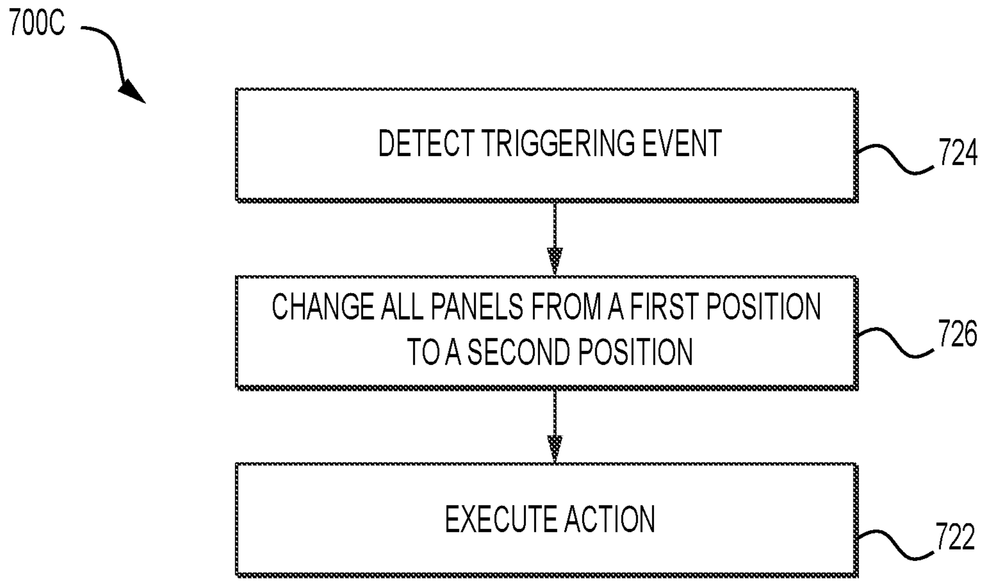

FIGS. 7A-7C are flow charts illustrating methods of operation of the modular exhaust devices discussed herein, according to embodiments of the present disclosure.

FIG. 7A is a flow chart of a method 700A of changing a MED from a first state to a second state, according to embodiments of the present disclosure. At operation 702, a first panel of a plurality of panels of the MED is changed from a first position to a second position, wherein the first position of the plurality of panels configures the MED in a first state, and the second position of the plurality of panels configured the MED in a second state. At operation 704, a second panel of the plurality of panels is changed from a first position to a second position. In one example, a plurality of coupling mechanisms may be used to secure at least one of the first panel and the second panel of the MED in the second position. At operation 706, a third panel of the plurality of panels is changed from the first position to the second position. At operation 708, a fourth panel of the plurality of panels is changed from the first position to the second position. In an example where the MED includes four panels, the MED is said to be configured in the second state after operation 708. In other configurations of the MED, if more panels are included, further operations may be executed to change the position of each of the plurality of panels one at a time, which may be described as sequentially and/or in series.

At operation 710, when the MED is configured in the second state, an action is executed. The action could be the startup of an industrial system which generates exhaust, for example, when the second state of the MED is the operational state. In another example, the action executed at operation 710 may be a transportation operation, for example, when the MED is configured in the transportation state. Prior to changing the first panel from a first position to a second position to initiate the change in state of the MED, in some examples, a triggering event may be detected at operation 718. This is discussed in more detail herein.

FIG. 7B is a flow chart of a method 700B of changing the state of a MED according to embodiments of the present disclosure. In the method 700B, at operation 712, at least two panels of a MED configured in the first state are changed from a first position to a second position. Subsequently, at operation 714, two different panels of the MED are changed from the first position to the second position. In an example where the MED includes four panels, the MED is said to be configured in the second state after operation 714. In other configurations of the MED, if more panels are included, further operations may be executed to change the position of each of the plurality of panels. In contrast to the method 700A, where a position of each panel of the plurality of panels is changed sequentially, the panel positions are changed in the method 700B in pairs or groups.

At operation 716, when the MED is configured in the second state, an action is executed. The action could be the startup of an industrial system which generates exhaust, for example, when the second state of the MED is the operational state. In another example, the action executed at operation 716 may be a transportation operation, for example, when the MED is configured in the transportation state. Prior to changing the first panel from a first position to a second position to initiate the change in state of the MED, in some examples, a change event or trigger may be detected at optional operation 720. This is discussed in more detail herein.

FIG. 7C is a flow chart of a method 700C of changing the state of a MED according to embodiments of the present disclosure. At operation 718, a change event is detected. As discussed herein, the gas turbine engine or other industrial system in which the MED is included may comprise a plurality of electronics including a controller and a non-transitory programmable memory, as well as wireless communication capability. The MED may thus be communicatively and/or electronically coupled to the industrial system.

In one example, the change event at operation 724 is an automated trigger such that a triggering event causes the state change of the MED. In this example, the triggering event detected at operation 724 (or operations 718 or 720) may be, for example, equipment start-up, equipment shut down, equipment validation, equipment installation, equipment removal, and/or other operational situations and/or parameters of the industrial system. In this example, the automated trigger causes the plurality of panels to change from a first position to a second position at operation 726 to change the MED from a first state to a second state at operation 726. In one example, the automated trigger at operation 724 may cause the plurality of panels to change one by one from the first position to the second position at operation 726. In another example, the automated trigger at operation 724 may cause the plurality of panels to change in sets of two or more from the first position to the second position at operation 726. In another example, the automated trigger at operation 724 may cause the plurality of panels to change simultaneously all at once from the first position to the second position. This may be the result, for example, when the plurality of panels is configured in a pinwheel or windowpane configuration to enable simultaneous transitions from the first position to the second position.

In another example, the triggering event detected at operation 724 is a manual trigger such as a button or a switch. Once initiated at operation 724, the triggering event causes the plurality of panels to change from a first position to a second position at operation 726 to change the MED from a first state to a second state. In one example, the manual trigger at operation 724 may cause the plurality of panels to change one by one from the first position to the second position at operation 726. In another example, the manual trigger at operation 724 may cause the plurality of panels to change in sets of two or more from the first position to the second position at operation 726. In another example, the manual trigger at operation 724 may cause the plurality of panels to change simultaneously all at once from the first position to the second position. This may be the result, for example, when the plurality of panels is configured in a pinwheel or windowpane configuration to enable simultaneous transitions from the first position to the second position.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of fuel injection system. Hence, although the present embodiments are, for convenience of explanation, depicted and described as being implemented in a gas turbine engine, it will be appreciated that it can be implemented in various other types of engines and machines with fuel injectors, and in various other systems and environments. Furthermore, there is no intention to be bound by any theory presented in any preceding section. It is also understood that the illustrations may include exaggerated dimensions and graphical representation to better illustrate the referenced items shown and are not considered limiting unless expressly stated as such.

What is claimed:

1. An exhaust device, comprising:

a plurality of panels including a first pair of panels and a second pair of panels collectively configured to transition from a first state to a second state, wherein the first pair of panels fold against and overlap with the second pair of panels in the first state such that the first and second pairs of panels are collapsed downward with a reduced dimension for transport, wherein the plurality of panels in the second state are unfolded relative to each other to extend upward with a larger dimension such that the plurality of panels is configured to direct exhaust in a predetermined direction; and a coupling mechanism associated with at least one panel of the plurality of panels, the coupling mechanism being configured to secure the at least one panel in at least one of a first position associated with the first state or a second position associated with the second state, wherein the second pair of panels defines at least one recess, and wherein at least one panel of the first pair of panels is configured to be received within the recess.

2. The exhaust device of claim 1, wherein the coupling mechanism comprises at least two coupling elements, wherein each coupling element is associated with a different panel of the plurality of panels.

3. The exhaust device of claim 1, wherein the coupling mechanism includes a mechanical mechanism, an electrical mechanism, a chemical mechanism, or a magnetic mechanism, or combinations thereof.

4. The exhaust device of claim 1, further comprising a storage region, the storage region being configured to include at least one tool configured to engage the coupling mechanism to change the exhaust device from at least one of the first state to the second state or from the second state to the first state.

5. A system comprising:

an exhaust system comprising at least one duct;

an exhaust device configured to fluidly couple to the at least one duct, the exhaust device being configured to be positioned in a first state and a second state, wherein the exhaust device comprises:

a plurality of panels configured to transition from a first state to a second state, wherein the plurality of panels in the first state includes at least a first panel and a second panel folded to overlap against each other and be collapsed downward with a reduced dimension for transport, wherein the plurality of panels in the second state includes at least the first panel unfolded relative to the second panel such that the first and second panels extend upward with a larger dimension and are configured to direct exhaust in a predetermined direction; and a first coupling mechanism associated with at least one panel of the plurality of panels, the first coupling mechanism being configured to position the at least one panel in at least one of a first position associated with the first state or a second position associated with the second state; and an enclosure positioned around the exhaust system, the enclosure including an aperture, the aperture being fluidly coupled to at least one of the exhaust device or the at least one duct of the exhaust system, wherein the first coupling mechanism is further configured to removably couple the exhaust device to the enclosure.

6. The system of claim 5, wherein the first coupling mechanism is configured to removably couple to at least one of another panel of the plurality of panels or the at least one duct.

7. The system of claim 5, further comprising:

a recess in the enclosure, the recess being co-located along a central axis with the aperture, wherein the exhaust device is removably coupled to the recess.

8. The system of claim 5, wherein the first coupling mechanism is configured to removably couple a panel of the plurality of panels to a different panel of the plurality of panels.

9. The system of claim 5, wherein, when configured in the first state, the exhaust device is configured to be removed from the system.

10. The system of claim 5, wherein, when configured in the first state, the exhaust device is configured to be transported while coupled to the system.

11. The system of claim 5, wherein the plurality of panels in the first state are arranged to cover the at least one duct.

12. The system of claim 5, wherein the first coupling mechanism is associated with the first panel, and wherein the first coupling mechanism removably couples the first panel to the enclosure in the second state.

13. The system of claim 12, further comprising a second coupling mechanism associated with the second panel, and wherein the second coupling mechanism removably couples the second panel to the enclosure in the second state.

14. The system of claim 13, further comprising a third coupling mechanism and the plurality of panels includes a third panel, wherein the third coupling mechanism is associated with the third panel, and wherein the third coupling mechanism removably couples the third panel to the enclosure in the second state.

15. The system of claim 14, wherein the enclosure includes a top surface, and wherein the first, second, and third coupling mechanisms removably couple the first, second, and third panels to the top surface, respectively.

16. A system comprising:

an exhaust system comprising at least one duct;

an exhaust device configured to fluidly couple to the at least one duct, the exhaust device being configured to be positioned in a first state and a second state, wherein the exhaust device comprises:

a plurality of panels configured to transition from a first state to a second state, wherein the plurality of panels in the first state includes a first panel, a second panel, and a third panel configured to be collapsed downward with a reduced dimension for transport, wherein the plurality of panels in the second state include the first, second, and third panels extending upward with a larger dimension and configured to direct exhaust in a predetermined direction; and a first coupling mechanism, a second coupling mechanism, and a third coupling mechanism respectively associated with the first, second, and third panels of the plurality of panels, the first, second, and third coupling mechanisms being configured to position the first, second, and third panels in at least one of a first position associated with the first state or a second position associated with the second state; and an enclosure positioned around the exhaust system, the enclosure including an aperture, the aperture being fluidly coupled to at least one of the exhaust device or the at least one duct of the exhaust system, wherein the first, second, and third coupling mechanisms removably couple the first, second and third panels to the enclosure, respectively, in the second state.

17. The system of claim 16, wherein the plurality of panels in the first state are arranged to cover the at least one duct.

18. The system of claim 16, wherein the enclosure includes a top surface, and wherein the first, second, and third coupling mechanisms removably couple the first, second, and third panels to the top surface, respectively.

* * * * *